E. & D. HINCHLEY.
Mower.

No. 55,654.

Patented June 19, 1866.

Witnesses:
George Andrews

Inventor:
Eleazer & David Hinchley
by their Attorney
R. H. Eddy.

UNITED STATES PATENT OFFICE.

ELEAZER HINCHLEY AND DAVID HINCHLEY, OF WORCESTER, MASS.

IMPROVEMENT IN MOWING-MACHINES.

Specification forming part of Letters Patent No. 55,654, dated June 19, 1866.

*To all whom it may concern:*

Be it known that we, ELEAZER HINCHLEY and DAVID HINCHLEY, both of the city and county of Worcester and State of Massachusetts, have invented a new and useful Improvement in Mowing-Machines; and we do hereby declare the same to be fully described in the following specification, and represented in the accompanying drawings, of which—

Figure 1:
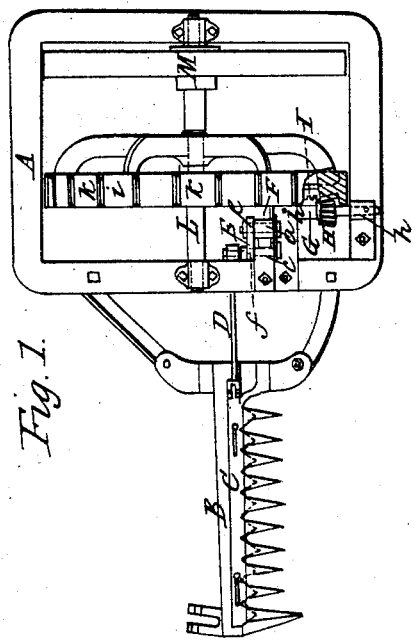
Figure 2:
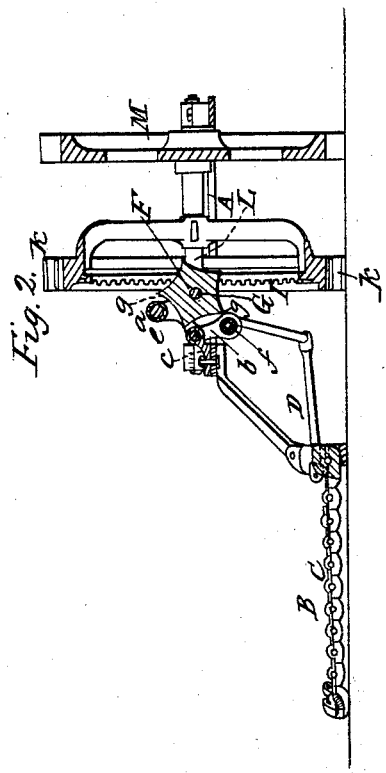

Figure 1 is a top view, and Fig. 2 a longitudinal and vertical section, of a mowing-machine provided with our invention, the said section being taken through the cam-wheel to be hereinafter described.

One great object we have had in view in making our improvement has been to obtain a very simple and effectual mechanism for operating the knife by means of the driving-wheel of the machine. This we accomplish by a peculiar cam-wheel—that is, one having an uneven number of cams—and by a rocker-lever and a connecting-rod, a beveled pinion and annulus, arranged and combined with the driving-wheel and the knife, as hereinafter explained.

In the said drawings, A denotes the frame of the machine, and B its toothed knife-bar, the latter being so hinged to the frame as to be capable of being turned from a horizontal position up into or about into a vertical one. C is the serrated knife or cutter, which is applied to the knife-bar, and is constructed so as to operate therewith in the ordinary manner.

A connecting-rod, D, hinged to the knife, leads and is jointed to the longer arm of a rocker-lever, E, which supports the journals of the friction-rollers $a\ b$, and has its fulcrum $c$ sustained by the frame A. The journals $e\ f$ of the friction-rollers are arranged on opposite sides of the fulcrum of the lever—that is, one journal is extended from one arm of the lever and the other journal is projected from the other arm of such lever, each journal being at an equal distance from the fulcrum.

A cam-wheel, F, shaped as shown in the drawings—that is, having a series of odd number of cams, $g\ g\ g$, projecting from its periphery—operates with the friction-rollers of the rocker-lever—that is, so as on being revolved to strike them alternately and produce a quick vibratory movement of the said rocker-lever, such as will cause it to impart to the knife its necessary longitudinal movements in the knife-bar in order to enable such knife to cut grass when interposed between the teeth of such bar. The said cam-wheel F is fixed to a short shaft, G, duly supported in boxes $h\ h$, and being provided with a bevel-pinion, H, to work into a beveled-toothed annulus, I, arranged within and making part of a wheel, K, in manner as represented in the drawings, the periphery of the rim $i$ of the wheel K being provided with teeth $k\ k$, to enable it to take hold of or adhere to the ground. The said wheel K is fixed to an axle, L, on which is another wheel, M, that revolves freely on the axle, and, with the wheel K, serves to support the machine on the ground.

A handle, pole, or shaft, may be affixed to the frame A, to enable the machine to be drawn over the surface of a piece of land either by manual or animal power.

The machine made as above described is very simple in construction, and has been designed specially as a hand machine for mowing lawns.

We claim—

The combination and arrangement of the cam-wheel F, rocker-lever E, connecting-rod D, the shaft G, and its beveled pinion H and annulus I, with the driving-wheel K, and the knife C, the said rocker-lever being provided with friction-rollers or projections for the cam-wheel to operate against, and the whole being substantially as specified, and for the purpose of operating the knife C by the revolution of the wheel K.

ELEAZER HINCHLEY.
DAVID HINCHLEY.

Witnesses:
R. H. EDDY,
GEORGE ANDREWS.